US009351341B2

(12) United States Patent
Nishide

(10) Patent No.: US 9,351,341 B2
(45) Date of Patent: May 24, 2016

(54) HEAT TREATMENT APPARATUS FOR HEATING SUBSTRATE BY IRRADIATING SUBSTRATE WITH FLASH OF LIGHT

(71) Applicant: DAINIPPON SCREEN MFG. CO., LTD., Kyoto (JP)

(72) Inventor: Nobuhiko Nishide, Kyoto (JP)

(73) Assignee: SCREEN Holdings Co., Ltd., Kyoto (JP)

(*) Notice: Subject to any disclaimer, the term of this patent is extended or adjusted under 35 U.S.C. 154(b) by 304 days.

(21) Appl. No.: 13/755,165

(22) Filed: Jan. 31, 2013

(65) Prior Publication Data

US 2013/0206747 A1 Aug. 15, 2013

(30) Foreign Application Priority Data

Feb. 15, 2012 (JP) ................................ 2012-030189

(51) Int. Cl.

| | |
|---|---|
| ***H05B 3/02*** | (2006.01) |
| ***H05B 1/00*** | (2006.01) |
| ***H05B 3/00*** | (2006.01) |
| *A21B 2/00* | (2006.01) |

(52) U.S. Cl.

CPC ................ *H05B 1/00* (2013.01); *H05B 3/0047* (2013.01)

(58) Field of Classification Search

USPC .......... 219/390, 405, 411, 538; 392/416, 418; 118/724, 725, 50.1

See application file for complete search history.

(56) References Cited

U.S. PATENT DOCUMENTS

| | | | | |
|---|---|---|---|---|
| 5,252,132 | A * | 10/1993 | Oda et al. | 118/725 |
| 5,842,690 | A | 12/1998 | Lee et al. | |
| 7,846,255 | B2 | 12/2010 | Yoneda et al. | |
| 2008/0230180 | A1 | 9/2008 | Yoneda et al. | |
| 2009/0175605 | A1 * | 7/2009 | Kobayashi | 392/416 |

FOREIGN PATENT DOCUMENTS

| | | |
|---|---|---|
| JP | 64-050524 | 2/1989 |
| JP | S64-050524 | 2/1989 |
| JP | H04-034732 | 3/1992 |
| JP | 0-181153 | 7/1997 |
| JP | H09-181153 | 7/1997 |
| JP | 2000-269310 | 9/2000 |
| JP | 2005-328027 | 11/2005 |
| JP | 2009-164451 | 7/2009 |
| JP | 2009-177062 | 8/2009 |
| JP | 2013-069990 | 4/2013 |

OTHER PUBLICATIONS

Office Action issued by Japanese Patent Office on Oct. 20, 2015 in connection with corresponding Japanese patent application No. 2012-030189.

* cited by examiner

*Primary Examiner* — Shawntina Fuqua
(74) *Attorney, Agent, or Firm* — Ostrolenk Faber LLP

(57) ABSTRACT

The front surface of a semiconductor wafer with a back surface supported by lift pins is irradiated with a flash of light from flash lamps, so that the semiconductor wafer is heated. A transparent restriction ring made of quartz is into abutment with or close to a peripheral portion of the front surface of the semiconductor wafer. In this state, the flash irradiation is performed. If the temperature of the front surface of the semiconductor wafer rises rapidly when the flash irradiation is performed, the restriction ring restrains the semiconductor wafer from jumping up from the lift pins. This prevents wafer cracking resulting from the jumping of the semiconductor wafer when the flash irradiation is performed.

3 Claims, 12 Drawing Sheets

HEAT TREATMENT APPARATUS FOR HEATING SUBSTRATE BY IRRADIATING SUBSTRATE WITH FLASH OF LIGHT

BACKGROUND OF THE INVENTION

1. Field of the Invention

The present invention relates to a heat treatment apparatus for heating a thin plate-like precision electronic substrate such as a semiconductor wafer and a glass substrate for a liquid crystal display device (hereinafter referred to simply as a “substrate”) by irradiating the substrate with a flash of light.

2. Description of the Background Art

In the process of manufacturing a semiconductor device, impurity doping is an essential step for forming a pn junction in a semiconductor wafer. At present, it is common practice to perform impurity doping by an ion implantation process and a subsequent annealing process. The ion implantation process is a technique for causing ions of impurity elements such as boron (B), arsenic (As) and phosphorus (P) to collide against the semiconductor wafer with high acceleration voltage, thereby physically implanting the impurities into the semiconductor wafer. The implanted impurities are activated by the subsequent annealing process. When annealing time in this annealing process is approximately several seconds or longer, the implanted impurities are deeply diffused by heat. This results in a junction depth much greater than a required depth, which might constitute a hindrance to good device formation.

In recent years, attention has been given to flash lamp annealing (FLA) that is an annealing technique for heating a semiconductor wafer in an extremely short time. The flash lamp annealing is a heat treatment technique in which xenon flash lamps (the term “flash lamp” as used hereinafter refers to a “xenon flash lamp”) are used to irradiate a surface of a semiconductor wafer with a flash of light, thereby raising the temperature of only the surface of the semiconductor wafer implanted with impurities in an extremely short time (several milliseconds or less).

The xenon flash lamps have a spectral distribution of radiation ranging from ultraviolet to near-infrared regions. The wavelength of light emitted from the xenon flash lamps is shorter than that of light emitted from conventional halogen lamps, and approximately coincides with a fundamental absorption band of a silicon semiconductor wafer. Thus, when a semiconductor wafer is irradiated with a flash of light emitted from the xenon flash lamps, the temperature of the semiconductor wafer can be raised rapidly, with only a small amount of light transmitted through the semiconductor wafer. Also, it has turned out that flash irradiation, that is, the irradiation of a semiconductor wafer with a flash of light in an extremely short time of several milliseconds or less allows a selective temperature rise only near the surface of the semiconductor wafer. Therefore, the temperature rise in an extremely short time with the xenon flash lamps allows only the activation of impurities to be achieved without deep diffusion of the impurities.

A heat treatment apparatus which employs such xenon flash lamps is disclosed in U.S. Patent Application Publication No. 2009/0175605 in which flash lamps are disposed on the front surface side of a semiconductor wafer and halogen lamps are disposed on the back surface side thereof so that a desired heat treatment is performed using a combination of these lamps. In the heat treatment apparatus disclosed in U.S. Patent Application Publication No. 2009/0175605, a semiconductor wafer held on a susceptor is preheated to a certain degree of temperature by the halogen lamps. Thereafter, the temperature of the semiconductor wafer is raised to a desired treatment temperature by the irradiation with a flash of light from the flash lamps.

The heat treatment apparatus employing such xenon flash lamps as disclosed in U.S. Patent Application Publication No. 2009/0175605, which momentarily irradiates the front surface of a semiconductor wafer with a flash of light having ultrahigh energy, raises the temperature of the front surface of the semiconductor wafer rapidly for a very short period of time to cause abrupt thermal expansion of the front surface of the semiconductor wafer, so that the semiconductor wafer tends to become deformed. This causes violent vibrations of the semiconductor wafer on the susceptor when the flash irradiation is performed. As a result, there is a danger that cracking occurs in the semiconductor wafer.

SUMMARY OF THE INVENTION

The present invention is intended for a heat treatment apparatus for heating a substrate by irradiating the substrate with a flash of light.

According to an aspect of the present invention, the heat treatment apparatus comprises: a chamber for receiving a substrate therein; a support part for supporting the substrate within the chamber; a flash lamp for irradiating a first surface of the substrate supported by the support part with a flash of light; and a restriction member provided on the first surface side of the substrate and for restricting the jumping of the substrate from the support part when the flash irradiation is performed.

This prevents cracking in the substrate resulting from the jumping of the substrate when the flash irradiation is performed.

Preferably, the first surface is a front surface on which a pattern is formed, and the restriction member restricts a peripheral portion of the front surface of the substrate in which no pattern is formed.

This prevents damages to a device pattern.

Preferably, the restriction member is a concave lens having a concave surface configured such that a distance from the front surface of the substrate decreases gradually from the center of the substrate toward the peripheral portion thereof.

The concave lens focuses a flash of light onto the peripheral portion of the substrate where the decrease in temperature is relatively prone to occur to achieve the effective heating of the substrate, thereby improving the uniformity of the in-plane temperature distribution of the substrate.

It is therefore an object of the present invention to prevent cracking in a substrate when flash irradiation is performed on the substrate.

These and other objects, features, aspects and advantages of the present invention will become more apparent from the following detailed description of the present invention when taken in conjunction with the accompanying drawings.

DESCRIPTION OF THE PREFERRED EMBODIMENTS

Preferred embodiments according to the present invention will now be described in detail with reference to the drawings.

First Preferred Embodiment

Figure 1:
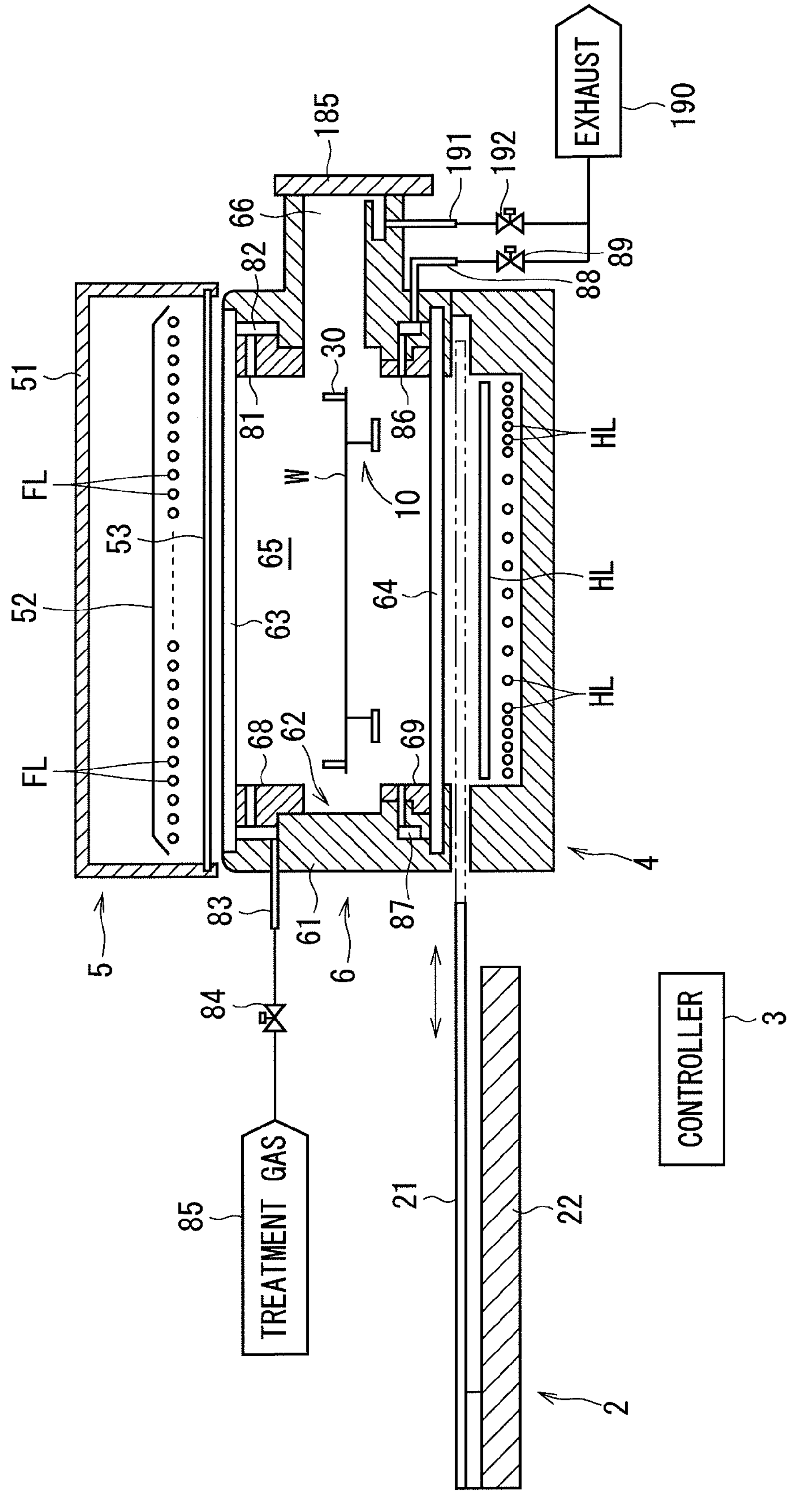
FIG. 1 is a longitudinal sectional view showing a configuration of a heat treatment apparatus according to the present invention.

FIG. 1 is a longitudinal sectional view showing a configuration of a heat treatment apparatus 1 according to the present invention. The heat treatment apparatus 1 according to a first preferred embodiment of the present invention is a flash lamp annealer for irradiating a disk-shaped semiconductor wafer W having a diameter of 300 mm and serving as a substrate with a flash of light to heat the semiconductor wafer W. A semiconductor wafer W prior to the transport into the heat treatment apparatus 1 is implanted with impurities. The heat treatment apparatus 1 performs a heating treatment on the semiconductor wafer W to thereby activate the impurities implanted in the semiconductor wafer W. In FIG. 1 and the subsequent figures, the dimensions of components and the number of components are shown in exaggeration or in simplified form, as appropriate, for the sake of easier understanding.

The heat treatment apparatus 1 includes a chamber 6 for receiving a semiconductor wafer W therein, a flash heating part 5 including a plurality of built-in flash lamps FL, a halogen heating part 4 including a plurality of built-in halogen lamps HL, and a shutter mechanism 2. The flash heating part 5 is provided over the chamber 6, and the halogen heating part 4 is provided under the chamber 6. The heat treatment apparatus 1 further includes a support mechanism 10 provided inside the chamber 6 and for receiving a semiconductor wafer W from the outside of the heat treatment apparatus 1 to support the semiconductor wafer W in a horizontal attitude, and a restriction ring 30 provided inside the chamber 6 and for abutment with a peripheral portion of a semiconductor wafer W. The heat treatment apparatus 1 further includes a controller 3 for controlling operating mechanisms provided in the shutter mechanism 2, the halogen heating part 4, the flash heating part 5, and the chamber 6 to cause the operating mechanisms to heat-treat a semiconductor wafer W.

The chamber 6 is configured such that upper and lower chamber windows 63 and 64 made of quartz are mounted to the top and bottom, respectively, of a tubular chamber side portion 61. The chamber side portion 61 has a generally tubular shape having an open top and an open bottom. The upper chamber window 63 is mounted to block the top opening of the chamber side portion 61, and the lower chamber window 64 is mounted to block the bottom opening thereof.

The upper chamber window 63 forming the ceiling of the chamber 6 is a disk-shaped member made of quartz, and serves as a quartz window that transmits flashes of light emitted from the flash heating part 5 therethrough into the chamber 6. The lower chamber window 64 forming the floor of the chamber 6 is also a disk-shaped member made of quartz, and serves as a quartz window that transmits light emitted from the halogen heating part 4 therethrough into the chamber 6.

An upper reflective ring 68 is mounted to an upper portion of the inner wall surface of the chamber side portion 61, and a lower reflective ring 69 is mounted to a lower portion thereof. Both of the upper and lower reflective rings 68 and 69 are in the form of an annular ring. The upper reflective ring 68 is mounted by being inserted downwardly from the top of the chamber side portion 61. The lower reflective ring 69, on the other hand, is mounted by being inserted upwardly from the bottom of the chamber side portion 61 and fastened with screws not shown. In other words, the upper and lower reflective rings 68 and 69 are removably mounted to the chamber side portion 61. An interior space of the chamber 6, i.e. a space surrounded by the upper chamber window 63, the lower chamber window 64, the chamber side portion 61, and the upper and lower reflective rings 68 and 69, is defined as a heat treatment space 65.

A recessed portion 62 is defined in the inner wall surface of the chamber 6 by mounting the upper and lower reflective rings 68 and 69 to the chamber side portion 61. Specifically, the recessed portion 62 is defined which is surrounded by a middle portion of the inner wall surface of the chamber side portion 61 where the reflective rings 68 and 69 are not mounted, a lower end surface of the upper reflective ring 68, and an upper end surface of the lower reflective ring 69. The recessed portion 62 is provided in the form of a horizontal annular ring in the inner wall surface of the chamber 6, and surrounds a semiconductor wafer W supported by the support mechanism 10.

The chamber side portion 61, and the upper and lower reflective rings 68 and 69 are made of a metal material (e.g., stainless steel) with high strength and high heat resistance. The inner peripheral surfaces of the upper and lower reflective rings 68 and 69 are provided as mirror surfaces by electrolytic nickel plating.

The chamber side portion 61 is provided with a transport opening (throat) 66 for the transport of a semiconductor wafer W therethrough into and out of the chamber 6. The transport opening 66 is openable and closable by a gate valve 185. The transport opening 66 is connected in communication with an outer peripheral surface of the recessed portion 62. Thus, when the transport opening 66 is opened by the gate valve 185, a semiconductor wafer W is allowed to be transported through the transport opening 66 and the recessed portion 62 into and out of the heat treatment space 65. When the transport opening 66 is closed by the gate valve 185, the heat treatment space 65 in the chamber 6 is an enclosed space.

An O-ring not shown is inserted between each of the upper and lower chamber windows 63 and 64 and the chamber side portion 61. An O-ring is also inserted between the gate valve 185 and the transport opening 66 when the transport opening 66 is closed by the gate valve 185. Thus, when the transport opening 66 is closed by the gate valve 185, the heat treatment space 65 in the chamber 6 is sealed off from the outside of the heat treatment apparatus 1. This allows the pressure in the heat treatment space 65 to increase to atmospheric pressure or higher and to decrease to a vacuum atmosphere.

At least one gas supply opening 81 for supplying a treatment gas (for example, an inert gas such as nitrogen ($N_2$) gas, helium (He) gas, and argon (Ar) gas; or oxygen ($O_2$) gas and the like) therethrough into the heat treatment space 65 is provided in an upper portion of the inner wall of the chamber 6. The gas supply opening 81 is provided above the recessed portion 62, and may be provided in the upper reflective ring 68. The gas supply opening 81 is connected in communication with a gas supply pipe 83 through a buffer space 82 provided in the form of an annular ring inside the side wall of the chamber 6. The gas supply pipe 83 is connected to a treatment gas supply source 85. A valve 84 is inserted at some midpoint in the gas supply pipe 83. When the valve 84 is opened, the treatment gas is fed from the treatment gas supply source 85 to the buffer space 82. The treatment gas flowing in the buffer space 82 flows in a spreading manner within the buffer space 82 which is lower in fluid resistance than the gas supply opening 81, and is supplied through the gas supply opening 81 into the heat treatment space 65.

On the other hand, at least one gas exhaust opening 86 for exhausting a gas from the heat treatment space 65 is provided in a lower portion of the inner wall of the chamber 6. The gas exhaust opening 86 is provided below the recessed portion 62, and may be provided in the lower reflective ring 69. The gas exhaust opening 86 is connected in communication with a gas exhaust pipe 88 through a buffer space 87 provided in the form of an annular ring inside the side wall of the chamber 6. The gas exhaust pipe 88 is connected to an exhaust part 190. A valve 89 is inserted at some midpoint in the gas exhaust pipe 88. For example, a vacuum pump may be used as the exhaust part 190. When the valve 89 is opened while the exhaust part 190 is in operation, the gas in the heat treatment space 65 is exhausted through the gas exhaust opening 86 and the buffer space 87 to the gas exhaust pipe 88. When the gate valve 185 closes the transport opening 66 to cause the heat treatment space 65 to become an enclosed space and the exhaust part 190 exhausts the gas without gas supply from the treatment gas supply source 85, a reduced-pressure atmosphere with a pressure lower than atmospheric pressure is produced in the heat treatment space 65. The at least one gas supply opening 81 and the at least one gas exhaust opening 86 may include a plurality of gas supply openings 81 and a plurality of gas exhaust openings 86, respectively, arranged in a circumferential direction of the chamber 6, and may be in the form of slits.

A gas exhaust pipe 191 for exhausting the gas from the heat treatment space 65 is also connected to a distal end of the transport opening 66. The gas exhaust pipe 191 is connected through a valve 192 to the exhaust part 190. By opening the valve 192, the gas in the chamber 6 is exhausted through the transport opening 66.

Figure 2:
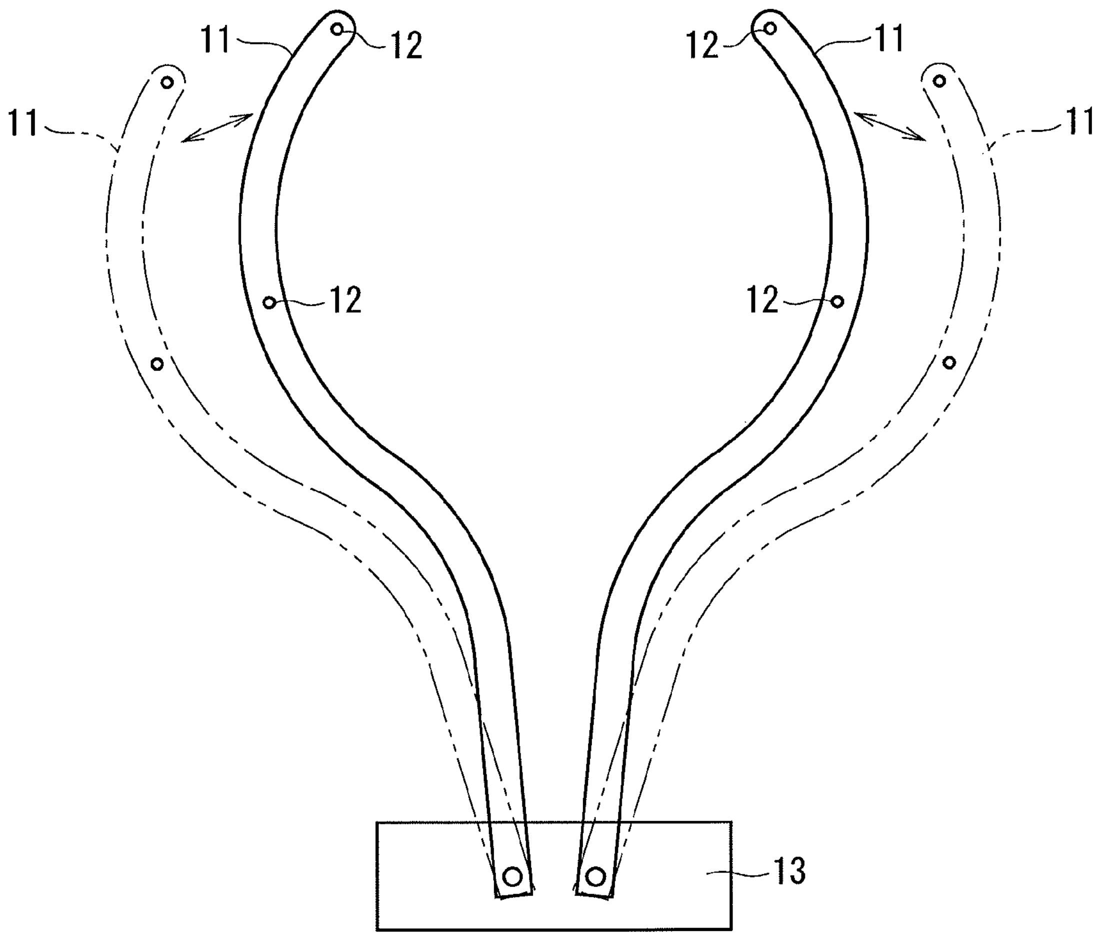
FIG. 2 is a plan view of a support mechanism.
Figure 3:
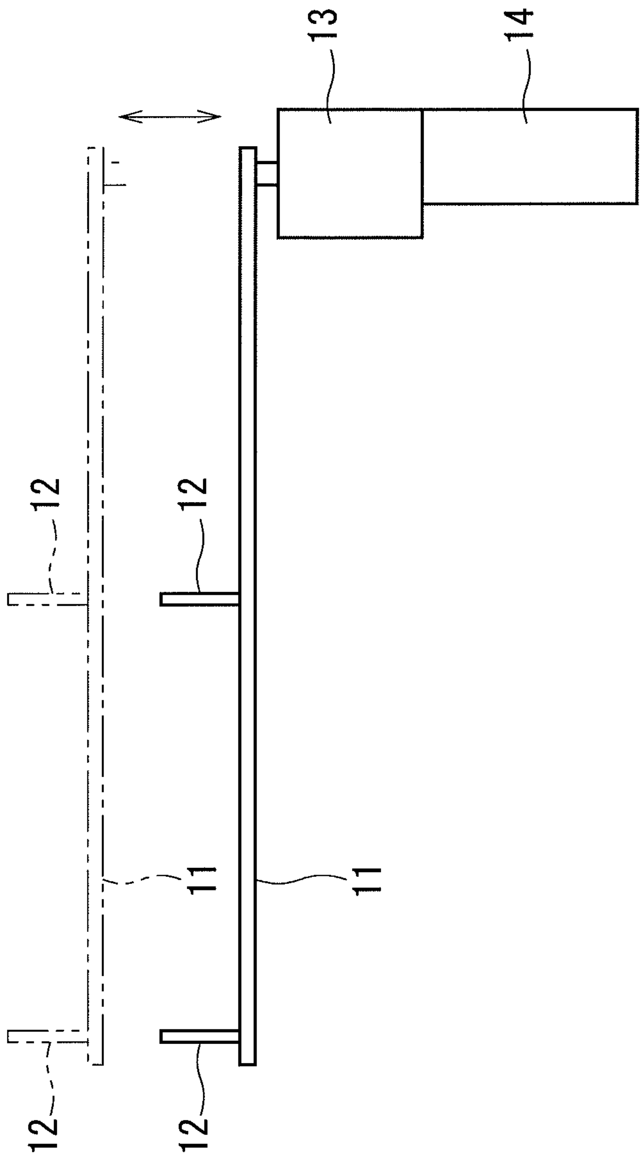
FIG. 3 is a side view of the support mechanism.

FIG. 2 is a plan view of the support mechanism 10. FIG. 3 is a side view of the support mechanism 10. The support mechanism 10 includes a pair of support arms 11 made of quartz. The support arms 11 are of an arcuate configuration extending substantially along the annular recessed portion 62. Each of the support arms 11 includes a pair of lift pins 12 made of quartz and mounted upright thereon. The support arms 11 are pivotable by a horizontal movement mechanism 13. The horizontal movement mechanism 13 moves the pair of support arms 11 horizontally between a transfer operation position (a position indicated by solid lines in FIG. 2) in which a semiconductor wafer W is transferred and a retracted position (a position indicated by dash-double-dot lines in FIG. 2) into which the support arms 11 are retracted when no treatment is performed. The retracted position of the pair of support arms 11 is inside the recessed portion 62 of the chamber 6. The horizontal movement mechanism 13 may be of the type which causes individual motors to pivot the support arms 11 respectively or of the type which uses a linkage mechanism to cause a single motor to pivot the pair of support arms 11 in cooperative relation.

The support arms 11 are moved upwardly and downwardly together with the horizontal movement mechanism 13 by an elevating mechanism 14. As the elevating mechanism 14 moves up and down the pair of support arms 11 in their transfer operation position, the four lift pins 12 in total provided on the support arms 11 move up and down in a vertical direction. An exhaust mechanism not shown is also provided near the location where the drivers (the horizontal movement mechanism 13 and the elevating mechanism 14) of the support mechanism 10 are provided, and is configured to exhaust an atmosphere around the drivers of the support mechanism 10 to the outside of the chamber 6.

When a transport robot outside the heat treatment apparatus 1 transports a semiconductor wafer W into the heat treatment space 65 and the support mechanism 10 moves up the pair of support arms 11 in their transfer operation position, the four lift pins 12 thrusts the semiconductor wafer W upwardly to receive the semiconductor wafer W. Then, the elevating mechanism 14 of the support mechanism 10 moves the pair of support arms 11 upwardly and downwardly to an appropriate vertical position, whereby the semiconductor wafer W is supported in a horizontal attitude in a predetermined treatment position within the chamber 6 by the four lift pins 12. After the treatment, the support arms 11 supporting the semiconductor wafer W are moved upwardly, and the aforementioned transport robot moves forward into the heat treatment space 65. Then, when the support mechanism 10 moves the pair of support arms 11 downwardly, the semiconductor wafer W supported by the four lift pins 12 is transferred to the transport robot. In this manner, the support mechanism 10 of the heat treatment apparatus 1 serves to transfer a semiconductor wafer W to and from the transport robot outside the heat treatment apparatus 1 and to support the semiconductor wafer W within the chamber 6.

The restriction ring 30 is provided above the support mechanism 10 within the chamber 6. Specifically, the restriction ring 30 is provided on a surface side of a semiconductor wafer W which receives a flash of light. The restriction ring 30 in the first preferred embodiment is a member having the shape of an annular ring and made of quartz transparent to a flash of light from the flash lamps FL. In the first preferred embodiment, flash irradiation is performed while the restriction ring 30 is in abutment with a peripheral portion of the semiconductor wafer W supported by the support mechanism 10.

Figure 4:
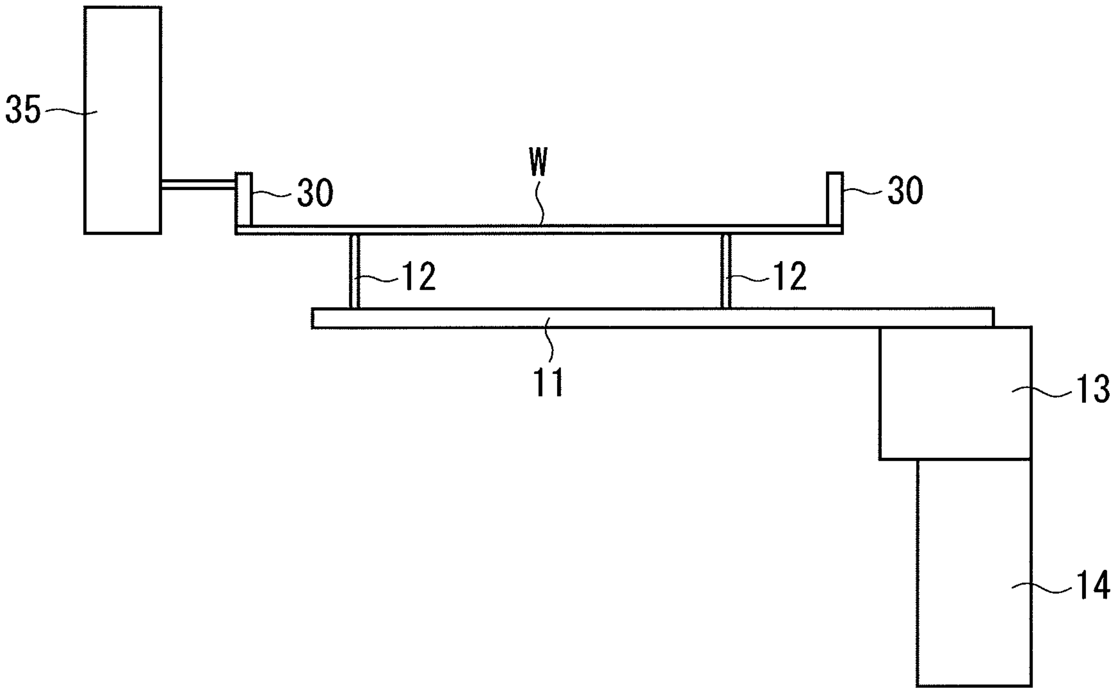
FIG. 4 is a view schematically showing the support mechanism and a restriction ring in abutment with a semiconductor wafer.
Figure 5:
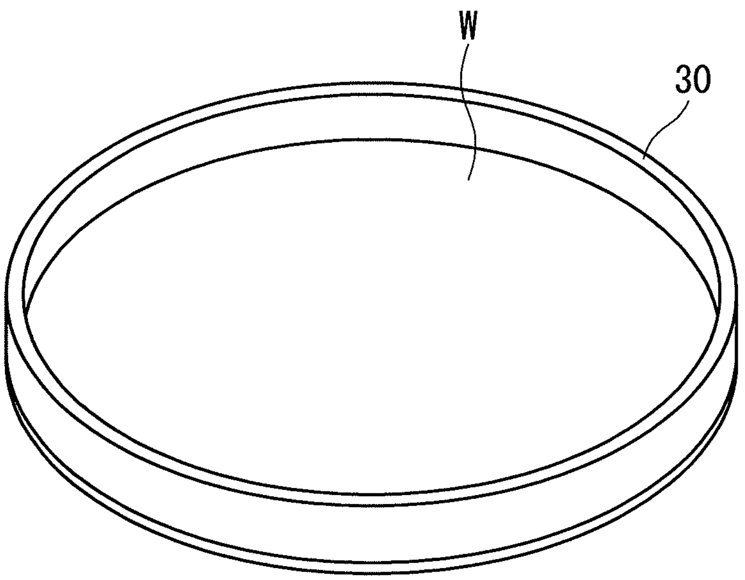
FIG. 5 is a perspective view of the restriction ring in abutment with a peripheral portion of a semiconductor wafer.

FIG. 4 is a view schematically showing the support mechanism 10 and the restriction ring 30 in abutment with a semiconductor wafer W. FIG. 5 is a perspective view of the restriction ring 30 in abutment with a peripheral portion of a semiconductor wafer W. The restriction ring 30 made of quartz has the shape of an annular ring with an inside diameter slightly smaller than the diameter (in this preferred embodiment, 300 mm) of the semiconductor wafer W. The height of the restriction ring 30 is not particularly limited, but shall be 20 mm, for example, in this preferred embodiment.

As stated above, the support mechanism 10 includes the elevating mechanism 14 which is capable of moving up and down the pair of support arms 11 supporting a semiconductor wafer W in a vertical direction. On the other hand, the restriction ring 30 is moved up and down in a vertical direction by a ring elevating part 35 attached to the chamber side portion 61.

In other words, the restriction ring 30 is moved relatively toward and away from the support mechanism 10 by the elevating mechanism 14 and the ring elevating part 35.

Figure 6:
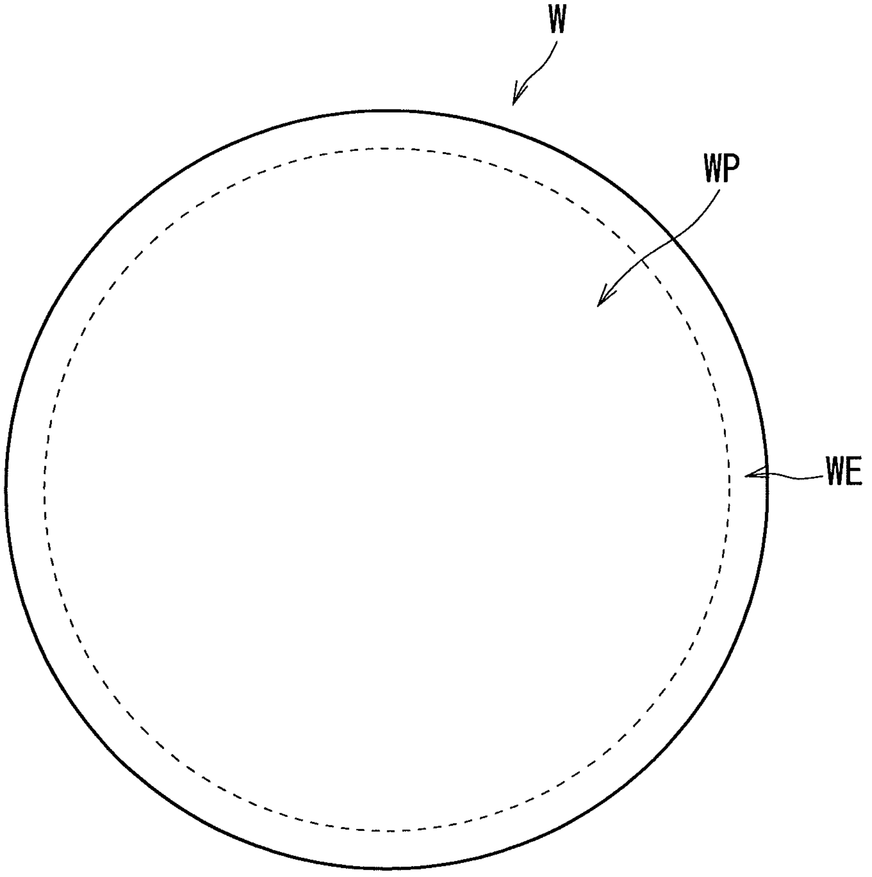
FIG. 6 is a plan view of a semiconductor wafer to be treated.

When the elevating mechanism 14 moves the pair of support arms 11 upwardly and the ring elevating part 35 moves the restriction ring 30 downwardly while the semiconductor wafer W is supported in a horizontal attitude by the four lift pins 12, then the restriction ring 30 is brought into abutment with a peripheral portion of the semiconductor wafer W. FIG. 6 is a plan view of a semiconductor wafer W to be treated. The semiconductor wafer W to be treated in the heat treatment apparatus 1 has a front surface on which a pattern of a semiconductor device is formed in a previous step. Impurities implanted into source/drain regions in the device pattern are activated by flash heating in the heat treatment apparatus 1. In general, such a device pattern is not entirely formed on the surface of a semiconductor wafer W. As shown in FIG. 6, the front surface of the semiconductor wafer W has a peripheral portion WE in which no pattern is formed, and a patterned portion WP lying inside the peripheral portion WE. The device pattern is formed only in the patterned portion WP. The restriction ring 30 has the shape of an annular ring corresponding to the peripheral portion WE of the semiconductor wafer W.

In the first preferred embodiment, the support mechanism 10 supporting the semiconductor wafer W and the restriction ring 30 move relative to each other (toward each other) before the flash irradiation, so that the restriction ring 30 is brought into abutment with the peripheral portion WE of the front surface of the semiconductor wafer W in which no pattern is formed. Thus, there is no danger that the restriction ring 30 causes damages to the device pattern.

Referring again to FIG. 1, the flash heating part 5 provided over the chamber 6 includes an enclosure 51, a light source provided inside the enclosure 51 and including the multiple (in the present preferred embodiment, 30) xenon flash lamps FL, and a reflector 52 provided inside the enclosure 51 so as to cover the light source from above. The flash heating part 5 further includes a lamp light radiation window 53 mounted to the bottom of the enclosure 51. The lamp light radiation window 53 forming the floor of the flash heating part 5 is a plate-like quartz window made of quartz. The flash heating part 5 is provided over the chamber 6, whereby the lamp light radiation window 53 is opposed to the upper chamber window 63. The flash lamps FL direct flashes of light from over the chamber 6 through the lamp light radiation window 53 and the upper chamber window 63 toward the heat treatment space 65.

The flash lamps FL, each of which is a rod-shaped lamp having an elongated cylindrical shape, are arranged in a plane so that the longitudinal directions of the respective flash lamps FL are in parallel with each other along a main surface of a semiconductor wafer W supported by the support mechanism 10 (that is, in a horizontal direction). Thus, a plane defined by the arrangement of the flash lamps FL is also a horizontal plane.

The xenon flash lamp FL includes a rod-shaped glass tube (discharge tube) containing xenon gas sealed therein and having positive and negative electrodes provided on opposite ends thereof and connected to a capacitor, and a trigger electrode attached to the outer peripheral surface of the glass tube. Because the xenon gas is electrically insulative, no current flows in the glass tube in a normal state even if electrical charge is stored in the capacitor. However, if a high voltage is applied to the trigger electrode to produce an electrical breakdown, electricity stored in the capacitor flows momentarily in the glass tube, and xenon atoms or molecules are excited at this time to cause light emission. Such a xenon flash lamp FL has the property of being capable of emitting extremely intense light as compared with a light source that stays lit continuously such as a halogen lamp HL because the electrostatic energy previously stored in the capacitor is converted into an ultrashort light pulse ranging from 0.1 to 10 milliseconds.

The reflector 52 is provided over the plurality of flash lamps FL so as to cover all of the flash lamps FL. A fundamental function of the reflector 52 is to reflect flashes of light emitted from the plurality of flash lamps FL toward the heat treatment space 65. The reflector 52 is a plate made of an aluminum alloy. A surface of the reflector 52 (a surface which faces the flash lamps FL) is roughened by abrasive blasting.

Figure 7:
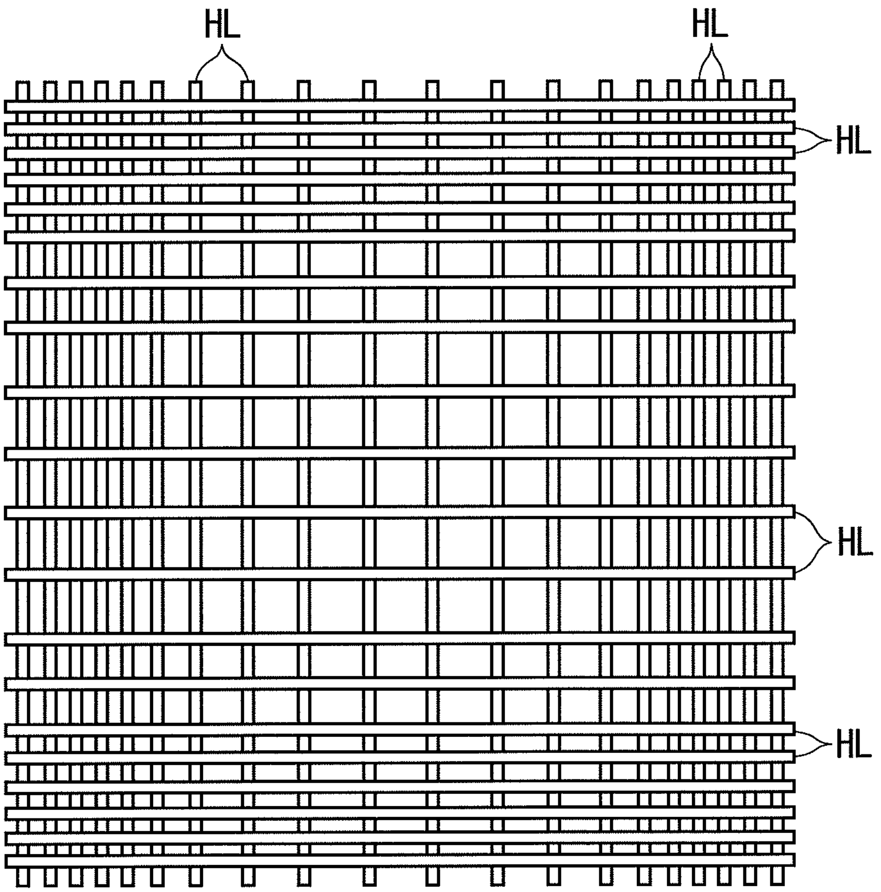
FIG. 7 is a plan view showing an arrangement of halogen lamps.

The multiple (in the present preferred embodiment, 40) halogen lamps HL are incorporated in the halogen heating part 4 provided under the chamber 6. The halogen lamps HL direct light from under the chamber 6 through the lower chamber window 64 toward the heat treatment space 65. FIG. 7 is a plan view showing an arrangement of the multiple halogen lamps HL. In the present preferred embodiment, 20 halogen lamps HL are arranged in an upper tier, and 20 halogen lamps HL are arranged in a lower tier. Each of the halogen lamps HL is a rod-shaped lamp having an elongated cylindrical shape. The 20 halogen lamps HL in the upper tier and the 20 halogen lamps HL in the lower tier are arranged so that the longitudinal directions thereof are in parallel with each other along a main surface of a semiconductor wafer W supported by the support mechanism 10 (that is, in a horizontal direction). Thus, a plane defined by the arrangement of the halogen lamps HL in each of the upper and lower tiers is also a horizontal plane.

As shown in FIG. 7, the halogen lamps HL in each of the upper and lower tiers are disposed at a higher density in a region opposed to the peripheral portion of the semiconductor wafer W supported by the support mechanism 10 than in a region opposed to the central portion thereof. In other words, the halogen lamps HL in each of the upper and lower tiers are arranged at shorter intervals near the edges of the lamp arrangement than in the central portion thereof. This allows a greater amount of light to impinge upon the peripheral portion of the semiconductor wafer W where a temperature decrease is prone to occur when the semiconductor wafer W is heated by the irradiation thereof with light from the halogen heating part 4.

The group of halogen lamps HL in the upper tier and the group of halogen lamps HL in the lower tier are arranged to intersect each other in a lattice pattern. In other words, the 40 halogen lamps HL in total are disposed so that the longitudinal direction of the halogen lamps HL in the upper tier and the longitudinal direction of the halogen lamps HL in the lower tier are orthogonal to each other.

Each of the halogen lamps HL is a filament-type light source which passes current through a filament disposed in a glass tube to make the filament incandescent, thereby emitting light. A gas prepared by introducing a halogen element (iodine, bromine and the like) in trace amounts into an inert gas such as nitrogen, argon and the like is sealed in the glass tube. The introduction of the halogen element allows the temperature of the filament to be set at a high temperature while suppressing a break in the filament. Thus, the halogen lamps HL have the properties of having a longer life than typical incandescent lamps and being capable of continuously emitting intense light. In addition, the halogen lamps HL, which are rod-shaped lamps, have a long life. The arrangement of the halogen lamps HL in a horizontal direction provides good efficiency of radiation toward the semiconductor wafer W provided over the halogen lamps HL.

Also as shown in FIG. 1, the heat treatment apparatus 1 includes the shutter mechanism 2 provided alongside the halogen heating part 4 and the chamber 6. The shutter mechanism 2 includes a shutter plate 21, and a sliding drive mechanism 22. The shutter plate 21 is a plate opaque to halogen light (light from a halogen light source), and is made of titanium (Ti), for example. The sliding drive mechanism 22 causes the shutter plate 21 to slidably move in a horizontal direction, thereby bringing the shutter plate 21 into and out of a light shielding position lying between the halogen heating part 4 and the heat treatment space 65. When the sliding drive mechanism 22 moves the shutter plate 21 forward, the shutter plate 21 is inserted into the light shielding position (a position indicated by dash-double-dot lines in FIG. 1) lying between the chamber 6 and the halogen heating part 4 to provide isolation between the lower chamber window 64 and the plurality of halogen lamps HL. Thus, light directed from the plurality of halogen lamps HL toward the heat treatment space 65 is intercepted. On the other hand, when the sliding drive mechanism 22 moves the shutter plate 21 backward, the shutter plate 21 is retracted from the light shielding position lying between the chamber 6 and the halogen heating part 4 to open the space lying under the lower chamber window 64.

The controller 3 controls the aforementioned various operating mechanisms provided in the heat treatment apparatus 1. The controller 3 is similar in hardware configuration to a typical computer. Specifically, the controller 3 includes a CPU for performing various computation processes, a ROM or read-only memory for storing a basic program therein, a RAM or readable/writable memory for storing various pieces of information therein, and a magnetic disk for storing control software, data and the like therein. The CPU in the controller 3 executes a predetermined processing program, whereby the processes in the heat treatment apparatus 1 proceed.

The heat treatment apparatus 1 further includes, in addition to the aforementioned components, various cooling structures to prevent an excessive temperature rise in the halogen heating part 4, the flash heating part 5 and the chamber 6 because of the heat energy generated from the halogen lamps HL and the flash lamps FL during the heat treatment of a semiconductor wafer W. As an example, a water cooling tube (not shown) is provided in the walls of the chamber 6. Also, the halogen heating part 4 and the flash heating part 5 have an air cooling structure for forming a gas flow therein to exhaust heat. Air is supplied to a gap between the upper chamber window 63 and the lamp light radiation window 53 to cool down the flash heating part 5 and the upper chamber window 63.

Figure 8:
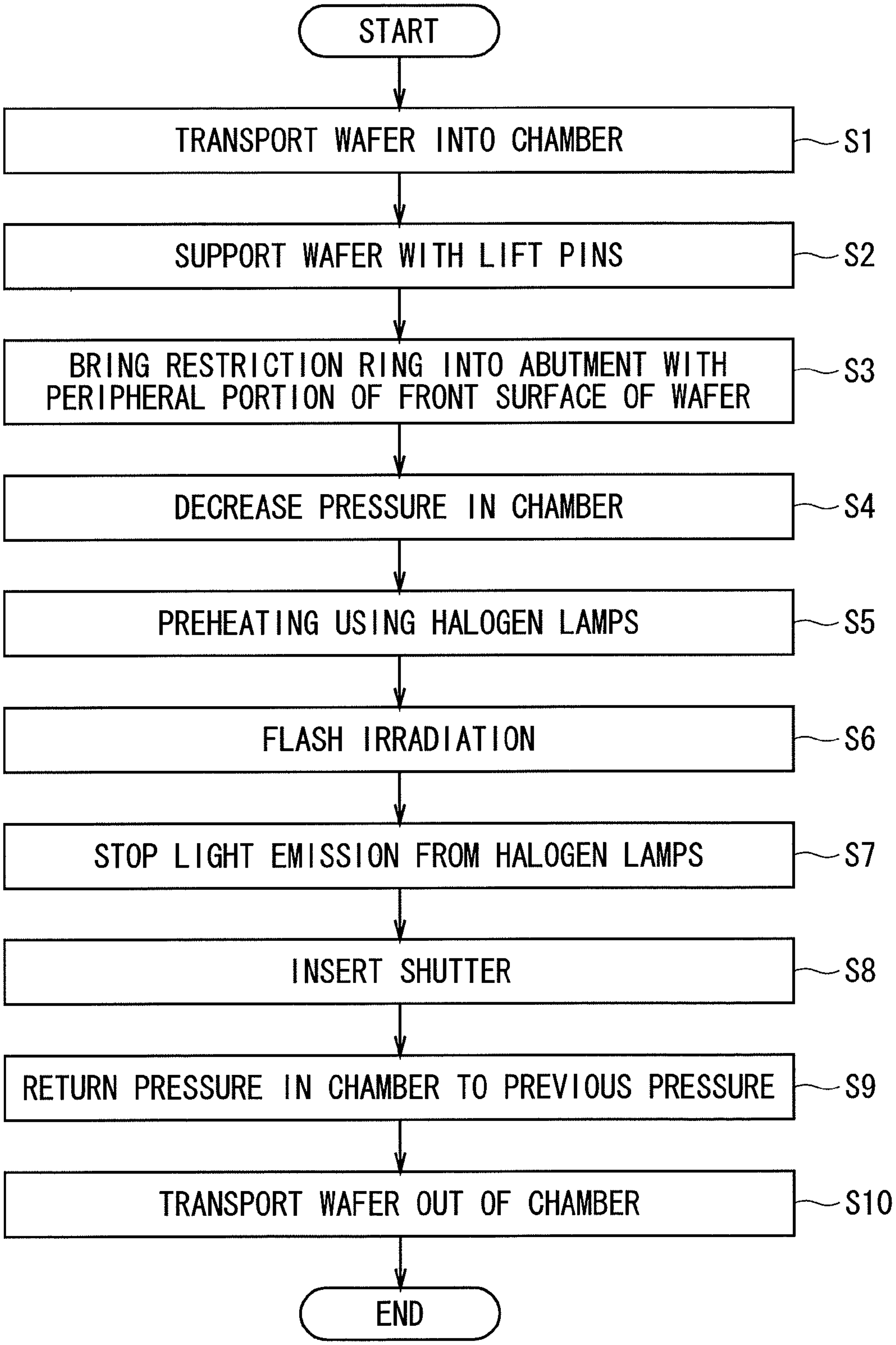
FIG. 8 is a flow diagram showing a procedure for treatment of a semiconductor wafer in the heat treatment apparatus of FIG. 1.

Next, a procedure for the treatment of a semiconductor wafer W in the heat treatment apparatus 1 will be described. A semiconductor wafer W to be treated herein is a semiconductor substrate of silicon doped with impurities (ions) by an ion implantation process. As shown in FIG. 6, the semiconductor wafer W has the patterned portion WP and the peripheral portion WE, and impurities are implanted in the patterned portion WP. The impurities are activated by the heat treatment apparatus 1 performing the process of heating (annealing) the semiconductor wafer W by flash irradiation. FIG. 8 is a flow diagram showing a procedure for the treatment of a semiconductor wafer W in the heat treatment apparatus 1. The procedure for the treatment of a semiconductor wafer W which will be described below proceeds under the control of the controller 3 over the operating mechanisms of the heat treatment apparatus 1.

First, the gate valve 185 is opened to open the transport opening 66. The transport robot outside the heat treatment apparatus 1 transports a semiconductor wafer W subjected to the ion implantation process through the transport opening 66 into the heat treatment space 65 of the chamber 6 (in Step S1). When the transport opening 66 is opened for the wafer transport into the heat treatment space 65, the valve 84 for supply of gas may be opened to supply an inert gas such as nitrogen gas from the gas supply opening 81 into the heat treatment space 65, thereby preventing outside atmosphere containing particles from flowing into the heat treatment space 65. At the same time, the valves 89 and 192 for exhaust of gas may be opened to exhaust the gas from the heat treatment space 65.

The semiconductor wafer W transported into the heat treatment space 65 by the transport robot is moved forward to a position lying over the transfer operation position of the support mechanism 10 and is stopped thereat. Then, the support arms 11 of the support mechanism 10 are moved horizontally from the retracted position to the transfer operation position and are then moved upwardly, whereby the lift pins 12 receive the semiconductor wafer W from the transport robot. After the semiconductor wafer W is transferred to the lift pins 12 of the support mechanism 10, the transport robot moves out of the heat treatment space 65, and the gate valve 185 closes the transport opening 66. At this time, the semiconductor wafer W is supported in a horizontal attitude by the four lift pins 12 of the support mechanism 10 (in Step S2). In the first preferred embodiment, the semiconductor wafer W is supported by the support mechanism 10 in such an attitude that a surface thereof which is patterned and implanted with impurities is the upper surface.

Next, the restriction ring 30 is moved relatively toward the semiconductor wafer W supported by the support mechanism 10 to come into abutment with the peripheral portion WE of the semiconductor wafer W (in Step S3). In this step, for example, the support mechanism 10 moves the semiconductor wafer W upwardly and downwardly to a predetermined treatment position in which an irradiation distance from the flash lamps FL and the halogen lamps HL to the semiconductor wafer W is appropriate, and positions the semiconductor wafer W. Thereafter, the ring elevating part 35 moves the restriction ring 30 downwardly to bring the restriction ring 30 into abutment with the peripheral portion WE of the semiconductor wafer W. The process for abutment of the restriction ring 30 is not limited to this. While one of the semiconductor wafer W and the restriction ring 30 stands still, the other may be moved upwardly and downwardly so that the restriction ring 30 comes into abutment with the peripheral portion WE of the semiconductor wafer W. In FIGS. 4 and 5, the restriction ring 30 is shown as being in abutment with the peripheral portion WE of the semiconductor wafer W.

After the restriction ring 30 is brought in abutment with the peripheral portion WE of the semiconductor wafer W supported in a horizontal attitude by the support mechanism 10, the pressure in the chamber 6 is decreased (in Step S4). At the time of completion of the transport of the semiconductor wafer W into the chamber 6, the gate valve 185 closes the transport opening 66 to cause the heat treatment space 65 to become an enclosed space. When the valve 89 is opened in this state while the exhaust part 190 is in operation, the gas in the heat treatment space 65 is exhausted through the gas exhaust opening 86, so that the pressure in the chamber 6 is decreased to a predetermined target gas pressure (for example, 1 Pa) less than atmospheric pressure. When the pressure is decreased, the valve 84 for the supply of gas is closed. On the other hand, the valve 192 may be opened to exhaust the gas in the chamber 6 also through the transport opening 66.

After the pressure in the chamber 6 is decreased to reach the predetermined target gas pressure, the 40 halogen lamps HL in the halogen heating part 4 turn on simultaneously to start preheating (or assist-heating) (in Step S5). Halogen light emitted from the halogen lamps HL is transmitted through the lower chamber window 64 made of quartz, and impinges upon the back surface (a main surface subjected to no patterning on the opposite side from the front surface) of the semiconductor wafer W. The semiconductor wafer W is preheated by being irradiated with the halogen light from the halogen lamps HL, so that the temperature of the semiconductor wafer W increases. The halogen light emitted from the halogen lamps HL is transmitted through the support arms 11 and the lift pins 12 of the support mechanism 10 to reach the back surface of the semiconductor wafer W because the support arms 11 and the lift pins 12 are made of transparent quartz. In other words, the support mechanism 10 supporting the back surface of the semiconductor wafer W does not become an obstacle to the preheating.

The temperature of the semiconductor wafer W is measured with a temperature sensor not shown when the halogen lamps HL perform preheating. A contact-type thermometer including a thermocouple, for example, may be used as the temperature sensor. The measured temperature of the semiconductor wafer W is transmitted to the controller 3. The controller 3 monitors whether the temperature of the semiconductor wafer W which is on the increase by the irradiation with light from the halogen lamps HL reaches a predetermined preheating temperature T1 or not. The preheating temperature T1 shall be on the order of 200° to 800° C., preferably on the order of 350° to 600° C., (in the present preferred embodiment, 600° C.) at which there is no apprehension that the impurities implanted in the semiconductor wafer W are diffused by heat.

After the temperature of the semiconductor wafer W reaches the preheating temperature T1, the controller 3 maintains the temperature of the semiconductor wafer W at the preheating temperature T1 for a short time. Specifically, at the time when the temperature of the semiconductor wafer W measured with the temperature sensor reaches the preheating temperature T1, the controller 3 controls the output from the halogen lamps HL to maintain the temperature of the semiconductor wafer W at approximately the preheating temperature T1.

By such preheating using the halogen lamps HL, the temperature of the entire semiconductor wafer W is uniformly increased to the preheating temperature T1. In the stage of preheating using the halogen lamps HL, the semiconductor wafer W shows a tendency to be lower in temperature in a peripheral portion thereof where heat dissipation is liable to occur than in a central portion thereof. However, the halogen lamps HL in the halogen heating part 4 are disposed at a higher density in the region opposed to the peripheral portion of the semiconductor wafer W than in the region opposed to the central portion thereof. This causes a greater amount of light to impinge upon the peripheral portion of the semiconductor wafer W where heat dissipation is liable to occur, thereby providing a uniform in-plane temperature distribution of the semiconductor wafer W in the stage of preheating. Further, the inner peripheral surface of the lower reflective ring 69 mounted to the chamber side portion 61 is provided as a mirror surface. Thus, a greater amount of light is reflected from the inner peripheral surface of the lower reflective ring 69 toward the peripheral portion of the semiconductor wafer W. This provides a more uniform in-plane temperature distribution of the semiconductor wafer W in the stage of preheating.

Subsequently, the front surface of the semiconductor wafer W is irradiated with a flash of light from the flash lamps FL of the flash heating part 5 (in Step S6). In this step, part of the flash of light emitted from the flash lamps FL travels directly toward the interior of the chamber 6. The remainder of the flash of light is reflected once from the reflector 52, and then travels toward the interior of the chamber 6. The irradiation of the semiconductor wafer W with such flashes of light achieves the flash heating of the semiconductor wafer W. In the first preferred embodiment, a flash of light is emitted from the flash lamps FL while the restriction ring 30 is in abutment with the peripheral portion WE of the semiconductor wafer W supported by the support mechanism 10. The flash of light is transmitted through the restriction ring 30 to impinge also upon the peripheral portion WE of the semiconductor wafer W because the restriction ring 30 is made of quartz transparent to the flash of light. This prevents the restriction ring 30 from obstructing the flash of light and thereby impairing the in-plane temperature distribution of the semiconductor wafer W.

The flash heating, which is achieved by the emission of a flash of light from the flash lamps FL, raises the temperature of the front surface of the semiconductor wafer W in a short time. Specifically, the flash of light emitted from the flash lamps FL is an intense flash of light emitted for an extremely short period of time ranging from about 0.1 to about 100 milliseconds as a result of the conversion of the previously stored electrostatic energy into such an ultrashort light pulse. The temperature of the front surface of the semiconductor wafer W subjected to the flash heating by the flash irradiation from the flash lamps FL momentarily rises to a treatment temperature T2 of 1000° C. or higher. After the impurities implanted in the semiconductor wafer W are activated, the temperature of the front surface of the semiconductor wafer W decreases rapidly. Because of the capability of increasing and decreasing the temperature of the front surface of the semiconductor wafer W in an extremely short time, the heat treatment apparatus 1 achieves the activation of the impurities implanted in the semiconductor wafer W while suppressing the diffusion of the impurities due to heat. Also, the oxidation of the front surface of the semiconductor wafer W on the molecular level is prevented because the front surface of the semiconductor wafer W is heated to the treatment temperature T2 in a reduced-pressure atmosphere. It should be noted that the time required for the activation of the impurities is extremely short as compared with the time required for the thermal diffusion of the impurities. Thus, the activation is completed in a short time ranging from about 0.1 to about 10 milliseconds during which no diffusion occurs.

The halogen lamps HL turn off after a predetermined time period has elapsed since the completion of the flash heating treatment (in Step S7). At the same time that the halogen lamps HL turn off, the shutter mechanism 2 inserts the shutter plate 21 into the light shielding position lying between the halogen heating part 4 and the chamber 6 (in Step S8). The temperatures of filaments and tube walls of the halogen lamps HL do not decrease immediately after the halogen lamps HL turn off, but radiant heat is continuously emitted from the filaments and the tube walls at elevated temperature for a short time interval to obstruct the temperature decrease of the semiconductor wafer W. The insertion of the shutter plate 21 interrupts the radiant heat emitted from the halogen lamps HL immediately after the turning off toward the heat treatment space 65 to increase the rate at which the temperature of the semiconductor wafer W decreases.

In addition to the decrease in the temperature of the semiconductor wafer W, the valve 84 is opened to supply nitrogen gas and the like into the heat treatment space 65, thereby returning the pressure in the chamber 6 to the previous pressure (in Step S9). Further, the ring elevating part 35 moves the restriction ring 30 upwardly away from the semiconductor wafer W. After the temperature of the semiconductor wafer W is decreased to a predetermined temperature or lower, the transport opening 66 which has been closed is opened by the gate valve 185, and the transport robot outside the heat treatment apparatus 1 transports the semiconductor wafer W supported by the lift pins 12 to the outside. Thus, the heating treatment of the semiconductor wafer W in the heat treatment apparatus 1 is completed (in Step S10).

In the first preferred embodiment, the flash irradiation from the flash lamps FL is performed while the restriction ring 30 is in abutment with the peripheral portion WE of the semiconductor wafer W supported by the four lift pins 12 of the support mechanism 10. When an intense flash of light emitted for an extremely short period of time ranging from about 0.1 to about 100 milliseconds impinges upon the front surface of the semiconductor wafer W, the temperature of the front surface of the semiconductor wafer W momentarily rises rapidly. This causes the abrupt thermal expansion of the front surface of the semiconductor wafer W, so that the semiconductor wafer W tends to become deformed. As a result, it has been found that in the absence of the restriction ring 30 the semiconductor wafer W vibrates violently to jump up from the lift pins 12.

In the first preferred embodiment, the semiconductor wafer W is irradiated with a flash of light while the restriction ring 30 is in abutment with the peripheral portion WE of the semiconductor wafer W. Thus, if the temperature of the front surface of the semiconductor wafer W rises rapidly when the flash irradiation is performed, the restriction ring 30 restrains the semiconductor wafer W from jumping up from the lift pins 12. As a result, this prevents wafer cracking resulting from the jumping of the semiconductor wafer W when the flash irradiation is performed.

Also, the restriction ring 30 is in abutment with the peripheral portion WE of the front surface of the semiconductor wafer W in which no pattern is formed. This prevents damages to the device pattern if friction is caused between the peripheral portion WE of the semiconductor wafer W and the restriction ring 30 when the flash irradiation is performed.

Also, the restriction ring 30 is made of quartz transparent to flashes of light. This prevents the restriction ring 30 from obstructing a flash of light reaching the front surface (in particular, the peripheral portion WE) of the semiconductor wafer W subjected to the flash irradiation and thereby deteriorating the in-plane temperature distribution of the semiconductor wafer W.

Also, the flash heating is achieved while the semiconductor wafer W is supported by the lift pins 12 of the support mechanism 10. This eliminates the need for a susceptor which has been conventionally required to reduce costs therefor.

Second Preferred Embodiment

Next, a second preferred embodiment according to the present invention will be described. The restriction ring 30 for abutment with the peripheral portion of a semiconductor wafer W is used in the first preferred embodiment. The second preferred embodiment differs from the first preferred embodiment in that a concave lens 130 is used in place of the restriction ring 30.

Figure 9:
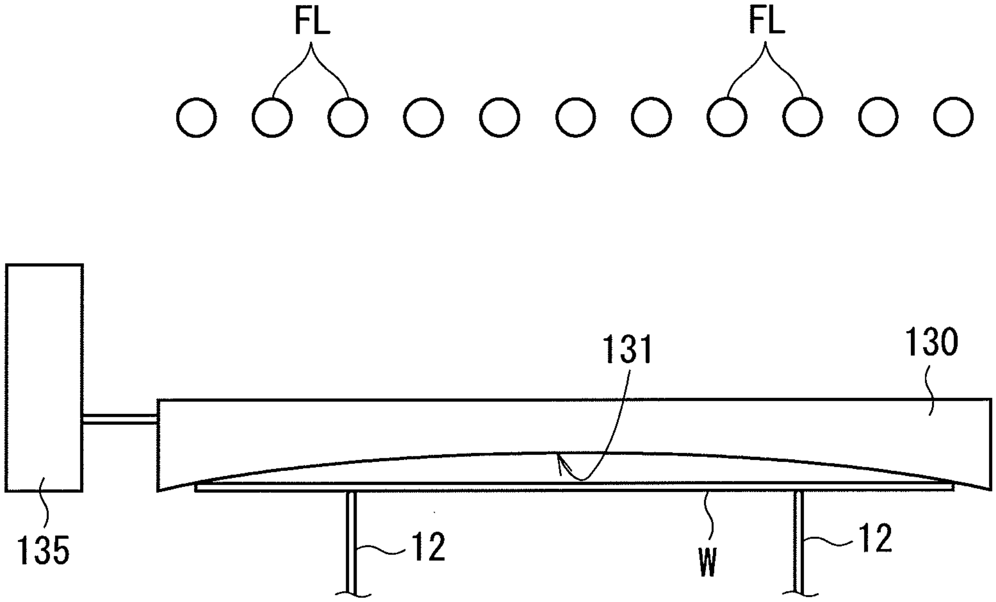
FIG. 9 is a view schematically showing a concave lens in abutment with a semiconductor wafer.

FIG. 9 is a view schematically showing the concave lens 130 in abutment with a semiconductor wafer W. The concave lens 130 according to the second preferred embodiment is provided above the support mechanism 10 (i.e., on a surface side of a semiconductor wafer W which receives a flash of light) in the chamber 6. The concave lens 130 is made of quart transparent to flashes of light from the flash lamps FL, and has a lower surface (a surface opposed to the semiconductor wafer W supported by the support mechanism 10) in the form of a concave surface 131. The concave surface 131 is a curved surface which is convex upward, i.e. a curved surface such that a distance from the front surface of the semiconductor wafer W decreases gradually from the center of the semiconductor wafer W supported by the support mechanism 10 toward the peripheral portion thereof. The concave surface 131 has a diameter greater than that of the semiconductor wafer W.

The concave lens 130 is moved up and down in a vertical direction by a lens elevating part 135 in a manner similar to that in the first preferred embodiment. In other words, the concave lens 130 is moved relatively toward and away from the support mechanism 10 by the elevating mechanism 14 of the support mechanism 10 and the lens elevating part 135.

As in the first preferred embodiment, the semiconductor wafer W is supported in a horizontal attitude by the four lift pins 12 of the support mechanism 10. The semiconductor wafer W is supported by the lift pins 12 in such an attitude that a surface thereof which is patterned and implanted with impurities is the upper surface. When the concave lens 130 is moved relatively toward the semiconductor wafer W supported in a horizontal attitude by the four lift pins 12, the concave surface 131 of the concave lens 130 is brought into abutment with the peripheral portion WE of the semiconductor wafer W. In the second preferred embodiment, the concave lens 130 comes into contact with the outermost periphery of the peripheral portion WE, i.e. an end edge portion of the semiconductor wafer W. The flash irradiation from the flash lamps FL is performed while the concave lens 130 is in abutment with the peripheral portion WE of the semiconductor wafer W. The remaining parts of the second preferred embodiment are similar to those of the first preferred embodiment except that the concave lens 130 is used in place of the restriction ring 30.

In this manner, the flash irradiation from the flash lamps FL is performed in the second preferred embodiment while the concave lens 130 is in abutment with the peripheral portion WE of the semiconductor wafer W supported by the four lift pins 12 of the support mechanism 10. Thus, if the temperature of the front surface of the semiconductor wafer W rises rapidly when the flash irradiation is performed, the concave lens 130 restrains the semiconductor wafer W from jumping up from the lift pins 12 in a manner similar to that in the first preferred embodiment. As a result, this prevents wafer cracking resulting from the jumping of the semiconductor wafer W when the flash irradiation is performed.

Also, a relatively large gap is formed between the patterned portion WP of the semiconductor wafer W and the concave surface 131 when the concave surface 131 of the concave lens 130 is in abutment with the peripheral portion WE of the semiconductor wafer W. If the front surface of the semiconductor wafer W is abruptly thermally expanded when the flash irradiation is performed, the patterned portion WP does not contact the concave surface 131. This prevents damages to the device pattern.

Further, the concave lens 130 in the second preferred embodiment focuses a flash of light from the flash lamps FL onto the peripheral portion WE of the semiconductor wafer W. This achieves the effective heating of the peripheral portion WE of the semiconductor wafer W where the decrease in temperature is relatively prone to occur when the flash irradiation is performed, thereby improving the uniformity of the in-plane temperature distribution. The concave surface 131 of the concave lens 130 is a curved surface in FIG. 9, but is not limited to this. It is only necessary that a gap formed between the semiconductor wafer W and the concave surface 131 of the concave lens 130 is large enough to prevent the patterned portion WP from contacting the concave surface 131 of the concave lens 130 if the front surface of the semiconductor wafer W is abruptly thermally expanded when the flash irradiation is performed. For example, a region of the concave surface 131 of the concave lens 130 which is opposed to the central portion of the semiconductor wafer W may be in the form of a flat surface parallel to the front surface of the semiconductor wafer W.

Third Preferred Embodiment

Next, a third preferred embodiment according to the present invention will be described. In the first preferred embodiment, the restriction ring 30 is in abutment with the entire perimeter of the peripheral portion WE of the semiconductor wafer W. The third preferred embodiment differs from the first preferred embodiment in that restriction blocks 230 are in abutment with only parts of the peripheral portion WE.

Figure 10:
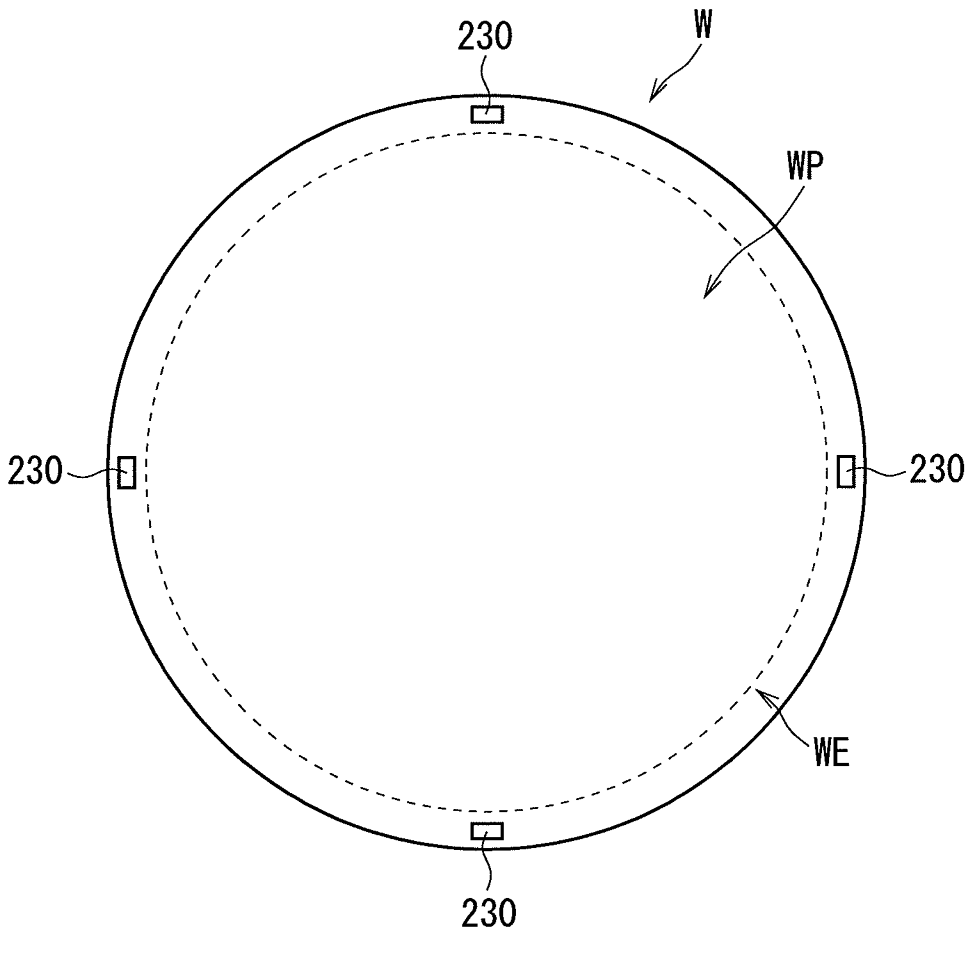
FIG. 10 is a view schematically showing restriction blocks in abutment with the peripheral portion of a semiconductor wafer.

FIG. 10 is a view schematically showing the restriction blocks 230 in abutment with the peripheral portion WE of a semiconductor wafer W. In the third preferred embodiment, four restriction blocks 230 are provided above the support mechanism 10 (i.e., on a surface side of a semiconductor wafer W which receives a flash of light), and each of the restriction blocks 230 is brought into abutment with the peripheral portion WE. Each of the restriction blocks 230 is a rod-shaped member (a rod) made of quartz transparent to flashes of light from the flash lamps FL. The four restriction blocks 230 may be moved up and down by an elevating mechanism similar to that of the first and second preferred embodiments or be fixedly provided in the chamber 6.

As in the first preferred embodiment, the semiconductor wafer W is supported in a horizontal attitude by the four lift pins 12 of the support mechanism 10. The semiconductor wafer W is supported by the lift pins 12 in such an attitude that a surface thereof which is patterned and implanted with impurities is the upper surface. When the four restriction blocks 230 and the semiconductor wafer W supported in a horizontal attitude by the four lift pins 12 are moved relatively toward each other, each of the four restriction blocks 230 is brought into abutment with the peripheral portion WE of the semiconductor wafer W. In the third preferred embodiment, as shown in FIG. 10, the four restriction blocks 230 are brought into abutment with four areas, respectively, which are spaced 90° apart from each other in a circumferential direction of the peripheral portion WE of the semiconductor wafer W. The flash irradiation from the flash lamps FL is performed while the four restriction blocks 230 are in abutment with the peripheral portion WE of the semiconductor wafer W. The remaining parts of the third preferred embodiment are similar to those of the first preferred embodiment except that the restriction blocks 230 are used in place of the restriction ring 30.

In this manner, the flash irradiation from the flash lamps FL is performed in the third preferred embodiment while the restriction blocks 230 are in abutment with the four areas of the peripheral portion WE of the semiconductor wafer W supported by the four lift pins 12 of the support mechanism 10. Thus, if the temperature of the front surface of the semiconductor wafer W rises rapidly when the flash irradiation is performed, the restriction blocks 230 restrain the semiconductor wafer W from jumping up from the lift pins 12 in a manner similar to that in the first preferred embodiment. As a result, this prevents wafer cracking resulting from the jumping of the semiconductor wafer W when the flash irradiation is performed.

Fourth Preferred Embodiment

Next, a fourth preferred embodiment according to the present invention will be described. In the fourth preferred embodiment, the flash heating is performed by irradiating the back surface of a semiconductor wafer W with a flash of light, and a restriction plate 330 for abutment with the entire back surface of the semiconductor wafer W is provided.

Figure 11:
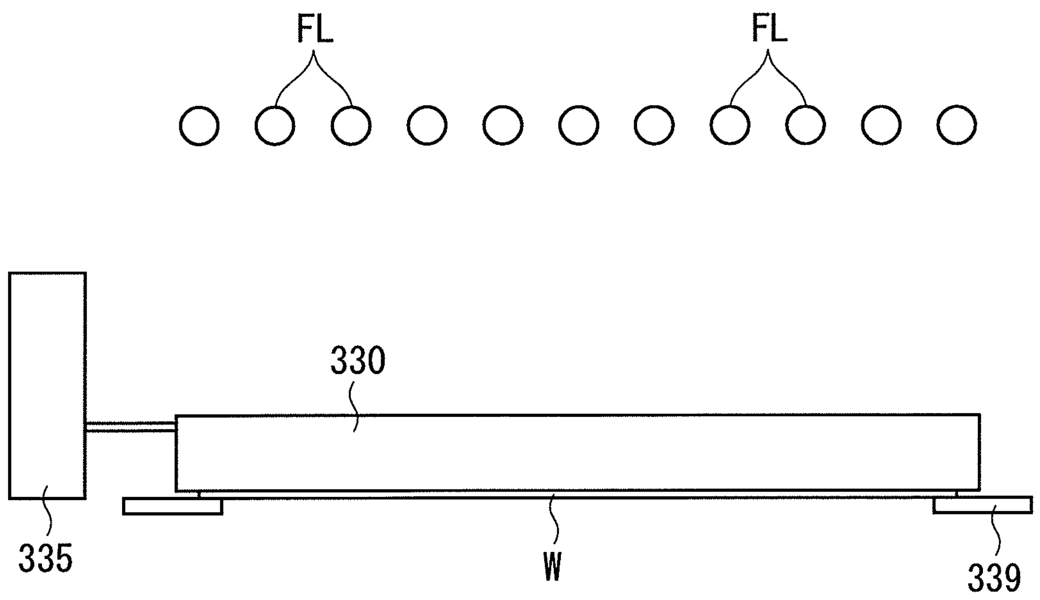
FIG. 11 is a view schematically showing a restriction plate in abutment with the back surface of a semiconductor wafer.

FIG. 11 is a view schematically showing the restriction plate 330 in abutment with the back surface of a semiconductor wafer W. In the fourth preferred embodiment, the semiconductor wafer W is supported in such an attitude that a surface thereof which is patterned and implanted with impurities is the lower surface. Thus, a ring-shaped susceptor 339 provided fixedly in the chamber 6 supports the peripheral portion WE of the semiconductor wafer W. The transfer of the semiconductor wafer W between the transport robot outside the heat treatment apparatus 1 and the susceptor 339 may be carried out, for example, by the support mechanism 10 of the first preferred embodiment.

The restriction plate 330 is provided above the susceptor 339 (i.e., on the back surface side of a semiconductor wafer W irradiated with a flash of light). The restriction plate 330 is a disk-shaped member made of quartz transparent to flashes of light from the flash lamps FL. The restriction plate 330 has a diameter greater than that of the semiconductor wafer W. The restriction plate 330 is moved up and down in a vertical direction by a plate elevating part 335.

In the fourth preferred embodiment, the semiconductor wafer W with the front surface positioned to face downward is transported into the chamber 6, and is supported by the susceptor 339 while remaining in the same attitude. The susceptor 339, which supports the peripheral portion WE of the semiconductor wafer W, does not contact the device pattern of the patterned portion WP. When the restriction plate 330 is moved relatively toward the semiconductor wafer W supported in a horizontal attitude by the susceptor 339, the restriction plate 330 is brought into abutment with the entire back surface of the semiconductor wafer W. In this state, the flash irradiation from the flash lamps FL is performed. A flash of light is transmitted through the restriction plate 330 made of quartz, and impinges upon the back surface of the semiconductor wafer W. This causes the temperature of the back surface of the semiconductor wafer W to rise rapidly, and the heat is conducted to the front surface of the semiconductor wafer W to cause the heating of the front surface. The remaining parts of the fourth preferred embodiment are similar to those of the first preferred embodiment.

In this manner, the flash irradiation from the flash lamps FL is performed in the fourth preferred embodiment while the restriction plate 330 is in abutment with the entire back surface of the semiconductor wafer W supported by the susceptor 339. Thus, if the temperature of the back surface of the semiconductor wafer W rises rapidly when the flash irradiation is performed, the restriction plate 330 restrains the semiconductor wafer W from jumping up from the susceptor 339.

As a result, this prevents wafer cracking resulting from the jumping of the semiconductor wafer W when the flash irradiation is performed.

In particular, the restriction plate 330 is in abutment with the entire back surface of the semiconductor wafer W in the fourth preferred embodiment. This restrains the vibrations of the semiconductor wafer W subjected to the flash irradiation with reliability.

In the fourth preferred embodiment, a flash of light impinges upon the back surface of the semiconductor wafer W having a uniform light absorptance because no pattern is formed thereon. Thus, the absorptance of a flash of light is not dependent on the pattern. This achieves a uniform in-plane temperature distribution of the semiconductor wafer W when the flash irradiation is performed.

Fifth Preferred Embodiment

Next, a fifth preferred embodiment according to the present invention will be described. The heat treatment apparatus in the fifth preferred embodiment is exactly identical in construction with that in the first preferred embodiment. In the first preferred embodiment, the restriction ring 30 is brought into abutment with the peripheral portion WE of the semiconductor wafer W. The fifth preferred embodiment differs from the first preferred embodiment in that the restriction ring 30 is brought close to the peripheral portion WE at a predetermined distance.

Figure 12:
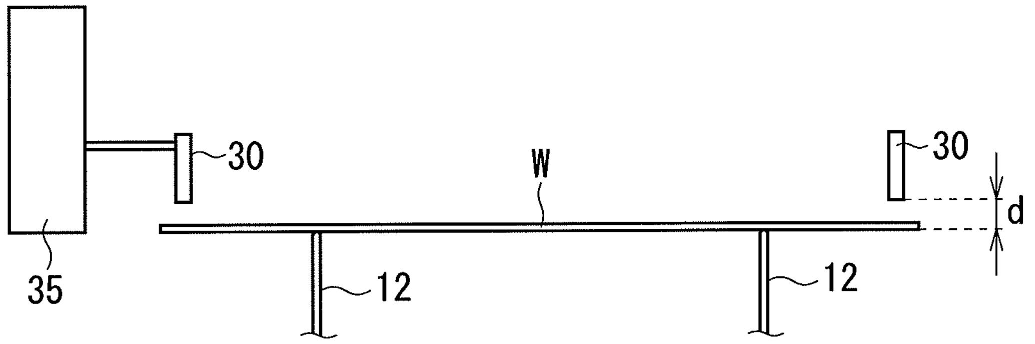
FIG. 12 is a view schematically showing a restriction ring close to a semiconductor wafer.

FIG. 12 is a view schematically showing the restriction ring 30 close to a semiconductor wafer W. As in the first preferred embodiment, the semiconductor wafer W is supported in a horizontal attitude by the four lift pins 12 of the support mechanism 10. The semiconductor wafer W is supported by the lift pins 12 in such an attitude that a surface thereof which is patterned and implanted with impurities is the upper surface. With the semiconductor wafer W supported in a horizontal attitude by the four lift pins 12, the restriction ring 30 is moved relatively to come close to a position spaced a predetermined distance d apart from the peripheral portion WE of the semiconductor wafer W. In the fifth preferred embodiment, the restriction ring 30 does not contact the peripheral portion WE of the semiconductor wafer W but is close to the peripheral portion WE at the predetermined distance d. Then, the flash irradiation from the flash lamps FL is performed while the restriction ring 30 is close to the peripheral portion WE of the semiconductor wafer W. The remaining parts of the fifth preferred embodiment are similar to those of the first preferred embodiment except that the restriction ring 30 is brought close to the peripheral portion WE of the semiconductor wafer W.

In this manner, the flash irradiation from the flash lamps FL is performed in the fifth preferred embodiment while the restriction ring 30 is close to the peripheral portion WE of the semiconductor wafer W supported by the four lift pins 12 of the support mechanism 10. Even in such a state that the restriction ring 30 is close to the peripheral portion WE of the semiconductor wafer W, the restriction ring 30 restrains the semiconductor wafer W from jumping up from the lift pins 12, if the temperature of the front surface of the semiconductor wafer W rises rapidly when the flash irradiation is performed. As a result, this prevents wafer cracking resulting from the jumping of the semiconductor wafer W when the flash irradiation is performed. For the effect of restraining the semiconductor wafer W from jumping up, it is necessary that the distance d at which the restriction ring 30 and the peripheral portion WE of the semiconductor wafer W are brought close to each other is not greater than 1.5 mm, preferably in the range of 0.3 to 0.5 mm. This is because the distance d greater than 1.5 mm causes a danger that the semiconductor wafer W collides with the restriction ring 30 to result in cracking therein when the flash irradiation is performed.

Also in the fifth preferred embodiment, the conduction of heat from the semiconductor wafer W raised in temperature by preheating to the restriction ring 30 does not occur because the restriction ring 30 is not in contact with the semiconductor wafer W.

This achieves a uniform in-plane temperature distribution of the semiconductor wafer W relatively easily.

Modifications

While the preferred embodiments according to the present invention have been described hereinabove, various modifications of the present invention in addition to those described above may be made without departing from the scope and spirit of the invention. For example, the restriction ring 30, which is brought into abutment with the peripheral portion WE of the semiconductor wafer W in the first preferred embodiment, is brought close to the peripheral portion WE of the semiconductor wafer W in the fifth preferred embodiment. Similarly, components in the second to fourth preferred embodiments corresponding to the restriction ring 30 may be brought close to the semiconductor wafer W. Specifically, the concave lens 130 in the second preferred embodiment, the restriction blocks 230 in the third preferred embodiment, and the restriction plate 330 in the fourth preferred embodiment may be brought close to the semiconductor wafer W at a predetermined distance. This also restrains the semiconductor wafer W from jumping up to result in wafer cracking, if the temperature of the front surface of the semiconductor wafer W rises rapidly when the flash irradiation is performed.

In summary, it is only necessary that a restriction member brought into abutment with or brought close to a surface of the semiconductor wafer W which receives a flash of light to restrict the jumping of the semiconductor wafer W when the flash irradiation is performed is provided on the surface side of the semiconductor wafer W which receives a flash of light. Examples of such a restriction member used herein include a quartz ring, a concave lens, a disk, and a rod. The provision of such a restriction member prevents wafer cracking resulting from the jumping of the semiconductor wafer W when the flash irradiation is performed.

In the first preferred embodiment, the restriction ring 30 is moved upwardly and downwardly by the ring elevating part 35. However, the restriction ring 30 may be fixedly provided in the chamber 6. When the restriction ring 30 is fixedly provided, the restriction ring 30 may be mounted to a frame incorporated in the chamber 6 or be directly welded to the upper chamber window 63 made of quartz. When the restriction ring 30 is fixedly provided, the support mechanism 10 moves the semiconductor wafer W upwardly and downwardly to thereby bring the restriction ring 30 into abutment with or close to the semiconductor wafer W. Similarly, the concave lens 130 in the second preferred embodiment, the restriction blocks 230 in the third preferred embodiment, and the restriction plate 330 in the fourth preferred embodiment may be fixedly provided in the chamber 6.

In the third preferred embodiment, the four restriction blocks 230 are spaced 90° apart from each other in a circumferential direction of the semiconductor wafer W.

However, the restriction blocks 230 are not limited to such a configuration. The number of restriction blocks 230 is only required to be greater than one. It is, however, preferable that at least three restriction blocks 230 are provided for the purpose of restricting the jumping of the semiconductor wafer W with reliability.

In the aforementioned preferred embodiments, a reduced-pressure atmosphere is produced in the chamber 6 when the flash heating is performed. However, the flash heating may be performed in a normal-pressure atmosphere. The use of the normal-pressure atmosphere can restrain the semiconductor wafer W from jumping up by creating a difference in gas pressure between areas over and under the semiconductor wafer W. However, the difference in gas pressure cannot be used in the reduced-pressure atmosphere as in the aforementioned preferred embodiments. For this reason, the technique according to the present invention is effective.

The restriction ring 30, the concave lens 130, the restriction blocks 230 and the restriction plate 330 are made of quartz in the aforementioned preferred embodiments, but are not limited to this. It is only necessary that the restriction ring 30, the concave lens 130, the restriction blocks 230 and the restriction plate 330 are made of a transparent material, such as sapphire for example, which allows light emitted from the flash lamps FL to pass therethrough, thereby guiding the light onto the semiconductor wafer W.

Also, the restriction ring 30, the concave lens 130, the restriction blocks 230 and the restriction plate 330 may be supported in such a manner as to have some play in a vertical direction for the purpose of absorbing the force of the semiconductor wafer W which will jump up when the flash irradiation is performed on the semiconductor wafer W.

Although the 30 flash lamps FL are provided in the flash heating part 5 according to the aforementioned preferred embodiments, the present invention is not limited to this. Any number of flash lamps FL may be provided. The flash lamps FL are not limited to the xenon flash lamps, but may be krypton flash lamps. Also, the number of halogen lamps HL provided in the halogen heating part 4 is not limited to 40. Any number of halogen lamps HL may be provided.

Also, in the aforementioned preferred embodiments, the semiconductor wafer W is preheated by irradiating the semiconductor wafer W with halogen light from the halogen lamps HL. The technique for preheating is not limited to this, but the semiconductor wafer W may be preheated by placing the semiconductor wafer W on a hot plate. The provision of a restriction member brought into abutment with or brought close to a surface of the semiconductor wafer W which receives a flash of light to restrict the jumping of the semiconductor wafer W placed on the hot plate when the flash irradiation is performed prevents wafer cracking resulting from the jumping of the semiconductor wafer W as in the aforementioned preferred embodiments.

Moreover, a substrate to be treated by the heat treatment apparatus according to the present invention is not limited to a semiconductor wafer, but may be a glass substrate for use in a flat panel display for a liquid crystal display apparatus and the like, and a substrate for a solar cell. Also, the technique according to the present invention may be applied to the joining of metal and silicon, and to the crystallization of polysilicon.

While the invention has been described in detail, the foregoing description is in all aspects illustrative and not restrictive. It is understood that numerous other modifications and variations can be devised without departing from the scope of the invention.

What is claimed is:

1. A heat treatment apparatus for heating a substrate by irradiating the substrate with a flash of light, comprising:

a chamber for receiving a substrate therein;

a support part for supporting the substrate within said chamber;

a flash lamp for irradiating a first surface of the substrate supported by said support part with a flash of light; and a restriction member provided on the first surface side of the substrate and for restricting the jumping of the substrate from said support part when the flash irradiation is performed wherein said first surface is a front surface on which a pattern is formed, and said restriction member restricts a peripheral portion of the front surface of the substrate in which no pattern is formed, and wherein said restriction member is a concave lens having a concave surface configured such that a distance from the front surface of the substrate decreases gradually from the center of the substrate toward the peripheral portion thereof.

2. A heat treatment apparatus for heating a substrate by irradiating the substrate with a flash of light, comprising:

a chamber for receiving a substrate therein;

a support part for supporting the substrate within said chamber;

a flash lamp for irradiating a first surface of the substrate supported by said support part with a flash of light; and a restriction member provided on the first surface side of the substrate and for restricting the jumping of the substrate from said support part when the flash irradiation is performed, said restriction member being made of a material transparent to said flash of light, wherein said first surface is a front surface on which a pattern is formed, and said restriction member restricts a peripheral portion of the front surface of the substrate in which no pattern is formed and wherein said restriction member includes a plurality of restriction blocks for abutment with the peripheral portion.

3. A heat treatment apparatus for heating a substrate by irradiating the substrate with a flash of light, comprising:

a chamber for receiving a substrate therein;

a support part for supporting the substrate within said chamber;

a flash lamp for irradiating a first surface of the substrate supported by said support part with a flash of light; and a restriction member provided on the first surface side of the substrate and for restricting the jumping of the substrate from said support part when the flash irradiation is performed wherein said first surface is a back surface opposite from a front surface on which a pattern is formed, and said restriction member restricts the entire back surface of the substrate.

* * * * *